United States Patent
Bruckman

(10) Patent No.: US 6,891,855 B2
(45) Date of Patent: May 10, 2005

(54) DYNAMIC PACKET FRAGMENTATION

(75) Inventor: Leon Bruckman, Petah Tikva (IL)

(73) Assignee: Corrigent Systems, Ltd., Tel Aviv (IL)

( * ) Notice: Subject to any disclaimer, the term of this patent is extended or adjusted under 35 U.S.C. 154(b) by 833 days.

(21) Appl. No.: 09/756,554

(22) Filed: Jan. 8, 2001

(65) Prior Publication Data

US 2002/0051466 A1 May 2, 2002

Related U.S. Application Data

(60) Provisional application No. 60/221,039, filed on Jul. 27, 2000.

(51) Int. Cl.[7] .................................................. H04J 3/24
(52) U.S. Cl. ...................................... 370/468; 370/474
(58) Field of Search ................................. 370/465, 466, 370/468, 473, 474, 476

(56) References Cited

U.S. PATENT DOCUMENTS

| | | | |
|---|---|---|---|
| 5,173,898 A | * | 12/1992 | Heinzmann et al. ........ 370/440 |
| 5,343,473 A | | 8/1994 | Cidon et al. |
| 5,497,371 A | | 3/1996 | Ellis et al. |
| 5,557,608 A | | 9/1996 | Calvignac et al. |
| 5,734,867 A | | 3/1998 | Clanton et al. |
| 5,742,592 A | | 4/1998 | Scholefield et al. |
| 5,999,565 A | * | 12/1999 | Locklear et al. ............. 375/222 |
| 6,026,093 A | * | 2/2000 | Bellaton et al. ............. 370/412 |
| 6,212,190 B1 | * | 4/2001 | Mulligan ..................... 370/400 |
| 6,366,589 B1 | * | 4/2002 | Naudus et al. .............. 370/468 |
| 6,553,003 B1 | * | 4/2003 | Chang ......................... 370/256 |
| 6,594,249 B1 | | 7/2003 | Goldberg |
| 6,594,278 B1 | | 7/2003 | Baroudi |
| 6,631,132 B1 | | 10/2003 | Sourani |
| 6,633,564 B1 | | 10/2003 | Steer et al. |
| 6,654,811 B1 | * | 11/2003 | Chaskar et al. ............. 709/236 |
| 2002/0041595 A1 | | 4/2002 | Delvaux |
| 2003/0103515 A1 | * | 6/2003 | Brown et al. ................ 370/412 |

OTHER PUBLICATIONS

Frame Replay Fragmentation Implementation Agreement—FRF. 12, pp. 1–19, Dec. 1997.

* cited by examiner

Primary Examiner—Chau Nguyen
Assistant Examiner—Christine Ng
(74) Attorney, Agent, or Firm—Darby & Darby

(57) ABSTRACT

A method and apparatus for transmitting data over a channel having a variable transmission rate. A transmitter determines the rate of transmission of the data over the channel and receives a datagram for transmission over the channel at the determined rate of transmission. The transmitter divides the datagram into fragments of a size no greater than a size limit that is set for the datagram responsive to the determined rate of transmission and transmits the fragments over the channel.

18 Claims, 2 Drawing Sheets

DYNAMIC PACKET FRAGMENTATION

CROSS-REFERENCE TO RELATED APPLICATIONS

This patent application claims the priority of U.S. provisional patent application No. 60/221,039, filed in Jul. 27, 2000, which is incorporated herein by reference.

FIELD OF THE INVENTION

The present invention relates generally to packet data communications, and specifically to packet fragmentation schemes.

BACKGROUND OF THE INVENTION

Modern digital communication systems are increasingly required to offer unified platforms for different types of services, such as voice, video, electronic mail (e-mail) and Web browsing. All of these services, each with its own Quality of Service (QoS) requirements, must be carried over a common channel. An important aspect of QoS is delay: while some applications, such as e-mail, can tolerate large delays and variations in delay from packet to packet, services such as packetized voice require that delay be maintained within strict limits.

Problems of packet delay are exacerbated particularly over low-bandwidth channels, such as copper wire access networks. This type of network is used in Digital Subscriber Line (DSL) service, which typically offers variable data rates that range from about 100 kbps up to 2.3 Mbps, depending on line quality and network conditions. To exemplify the problem, assume that packets carried over DSL lines can range in size from 64 bytes up to 1544 bytes, as is common in Internet Protocol (IP) networks. At 2 Mbps, a 64-byte packet will take only 250 $\mu$s to transmit, while at 128 kbps, it will take 4 ms. On the other hand, at 128 kbps, a 1544-byte packet will take 96 ms to transmit. If a stream of short voice packets is interspersed with long e-mail packets over a 128 kbps channel, as may commonly happen, the voice packets will usually follow one another almost instantaneously, but will at times be delayed by as much as 96 ms while waiting for a long e-mail packet to pass. To deal with this large jitter, the receiver in such a system must have a deep buffer and will have a long, built-in delay of nearly 100 ms in delivering the packets to the user.

One solution to this problem is to fragment packets into smaller units at the transmitter, and then reassemble the packets at the receiver. For example, in Asynchronous Transfer Mode (ATM) networks, all data are transmitted in cells of exactly 53 bytes each. Each cell must carry its own five-byte header, thus adding a 10% overhead factor to the packet overhead already existing in the system. This high overhead rate must be tolerated in low-bandwidth channels, in order to keep the maximum delay of high-priority packets (such as voice) within limits of a few milliseconds. When higher bandwidth is available, however, it is desirable to use longer fragments, in order to reduce the relative transmission overhead.

Thus, there are fragmentation schemes known in the art that allow the system operator to select the fragment size that will be used over a given channel. One such scheme is described in Frame Relay Fragmentation Implementation Agreement FRF.12, published by the Frame Relay Forum. This document, which is incorporated herein by reference, is also included as an appendix in the above-mentioned provisional patent application. The FRF.12 agreement specifies that when data frames longer than a preset length are to be transmitted over a frame relay channel, the frames are first divided into fragments. Each fragment includes a Beginning and Ending flag and a sequence number, which enable the receiver to sort and reassemble the fragments back into the original frames, along with other header information. The total number of overhead bits is thus fixed, but the size of the payload data varies depending on the selected fragment size.

The FRF.12 agreement presents an analysis of transmission efficiency (ratio of payload to total data carried by a fragment) as a function of payload size, in which it is shown that the efficiency generally increases as the payload size grows. The agreement indicates that the maximum fragment size should be configured by the operator for each channel depending on the speed and application requirements of the channel. For variable-rate channels, such as DSL links, this means that the fragment size must be set for the worst case, i.e., the slowest possible channel speed, in order to avoid unacceptable delays. Thus, even when high-speed service becomes available, the efficiency of transmission is limited by the low-speed fragmentation constraints.

SUMMARY OF THE INVENTION

It is an object of the present invention to provide improved methods and systems for datagram fragmentation in digital data networks.

It is a particular object of some aspects of the present invention to provide methods for datagram fragmentation that satisfy network delay constraints in low-speed operation, while achieving enhanced transmission efficiency at high speeds.

In preferred embodiments of the present invention, a transmitter receives datagrams for transmission over a network channel to a receiver. In the context of the present patent application and in the claims, the term "datagram" is used to refer to any block of data with a predefined destination in the network, including (but not limited to) data packets and frames. The transmitter divides the datagram into fragments, whose size is determined dynamically by the transmitter depending on network conditions and constraints. The fragment length can thus increase automatically with increasing data rate, without reprogramming by an operator, unlike variable-length fragmentation systems known in the art.

Preferably, the transmitter is preprogrammed by a user with parameters that include a maximum permissible delay in transmitting a high-priority datagram. The transmitter then determines the optimal fragment size for efficient transmission, depending on the instantaneous channel speed and the preprogrammed parameters. In contrast to the present invention, methods of fragmentation known in the art require that the fragment size be configured in advance, and do not permit dynamic size adjustment by the transmitter.

There is therefore provided, in accordance with a preferred embodiment of the present invention, a method for transmitting data over a channel having a variable transmission rate, including:

determining the rate of transmission of the data over the channel;

receiving a datagram for transmission over the channel at the determined rate of transmission;

dividing the datagram into fragments of a size no greater than a size limit that is set for the datagram responsive to the determined rate of transmission; and transmitting the fragments over the channel.

In a preferred embodiment, the channel includes a Digital Subscriber Line (DSL) network access channel, and the rate of transmission is in a range between about 100 kilobits per second (kbps) and about 2300 kbps. Further preferably, the datagram includes a data packet.

Preferably, dividing the datagram includes setting the size limit such that a length of time required to transmit each of the fragments is no greater than a predetermined maximum time. Typically, receiving the datagram includes receiving a datagram associated with a low-priority service, and the predetermined maximum time includes a maximum delay applicable to other datagrams associated with a high-priority service, which are also transmitted over the channel. Most preferably, transmitting the fragments includes interrupting transmission of the fragments of the datagram associated with the low-priority service in order to transmit at least one of the other datagrams associated with the high-priority service with a delay no greater than the maximum delay.

Further preferably, dividing the datagram into fragments includes increasing the size limit as the rate of transmission increases. Most preferably, dividing the datagram includes dividing the datagram into fragments having a fixed overhead size and a variable payload size, such that a ratio of the payload size to the overhead size increases as the rate of transmission increases. Alternatively or additionally, dividing the datagram into fragments includes setting the size limit responsive to fragmentation control parameters programmed by a human operator, wherein increasing the size limit includes increasing the limit automatically as the rate of transmission increases, substantially without alteration of the parameters.

Preferably, the method includes receiving the fragments over the channel at a receiver, and processing the fragments responsive to the variable rate of transmission so as to reassemble the datagram.

There is also provided, in accordance with a preferred embodiment of the present invention, apparatus for transmitting data over a channel having a variable transmission rate, including a transmitter, adapted to set the rate of transmission of the data over the channel and to set a fragment size limit responsive to the determined rate of transmission and, upon receiving a datagram for transmission over the channel, to divide the datagram into fragments of a size no greater than the fragment size limit and to transmit the fragments over the channel.

The present invention will be more fully understood from the following detailed description of the preferred embodiments thereof, taken together with the drawings in which:

DETAILED DESCRIPTION OF PREFERRED EMBODIMENTS

Figure 1:
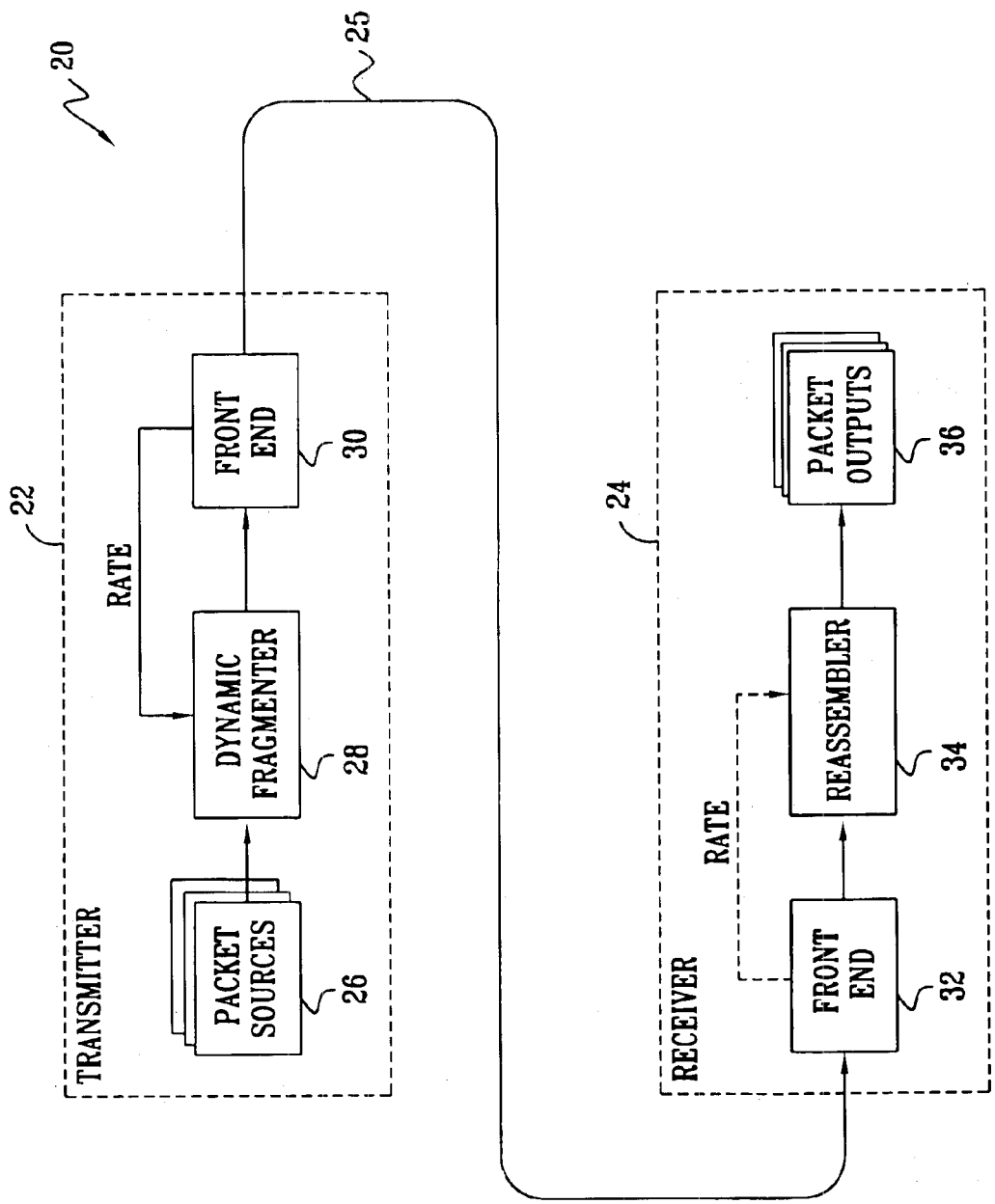
FIG. 1 is a block diagram that schematically illustrates a system for data communications, in accordance with a preferred embodiment of the present invention.

FIG. 1 is a block diagram 20 that schematically illustrates a system 20 for data transmission, in accordance with a preferred embodiment of the present invention. System 20 comprises a transmitter 22 and a receiver 24, linked by a communication channel 25. The communication channel is typically a variable-rate channel, as is encountered, for example, in DSL access networks, as described in the Background of the Invention. Alternatively, the channel may be a part of substantially any other type of data network that carries packets or other datagrams.

Transmitter 22 comprises packet sources 26, as are known in the art, which generate respective streams of data packets for transmission over channel 25. Typically, the different packet sources transmit different types of data, such as voice, video, e-mail, Web browsing, etc., and therefore have different QoS requirements and priorities. A dynamic packet fragmenter 28 determines the sizes of fragments into which the packets from sources 26 are to be divided. When an input packet from one of sources 26 exceeds the determined fragment size, fragmenter 28 divides the packet for transmission into multiple fragments. The sizes of the fragments are determined by the fragmenter automatically, as described below, based on the variable rate of transmission of data over channel 25 by a transmitter front end 30, within bounds dictated by control parameters input by an operator of system 20. As a rule, the higher the rate of transmission, the longer the fragments that fragmenter 28 will create.

Fragments transmitted over channel 25 are received at a front end 32 of receiver 24. A reassembler 34 reassembles the fragments into the original packets generated by sources 26. Preferably, the fragments contain header information that facilitates packet reassembly, as well as enabling the reassembler to identify and discard all of the fragments in a packet when any of the fragments in the packet is lost in transmission. These features of packet reassembly are described, for example, in the above-mentioned FRF.12 agreement. Reassembler 34 does not need to know the data rate of channel 25 in order to reassemble the received packets, since the reassembly process remains essentially the same regardless of changes in the fragment sizes. It is advantageous to provide this rate information to the reassembler, however, since the reassembler can then determine the sizes of fragments that it should expect and can adjust the sizes of its buffers accordingly. The reassembled packets are conveyed to appropriate packet outputs 36 for the different services supported by the system.

In a preferred embodiment, transmitter 22 and receiver 24 belong to respective DSL modems. Typically, the digital processing functions in such modems are carried out by a general-purpose central processing unit (CPU) with suitable software, and/or by a suitably-programmed digital signal processor (DSP). Although for the sake of clarity, the fragmenter and reassembler are shown in FIG. 1 as separate functional blocks, in actuality, the fragmentation and reassembly functions of the transmitter and receiver are preferably carried out by the same CPU or DSP as other digital processing functions of system 20. As these other functions are well known in the art, they are omitted from FIG. 1.

Figure 2:
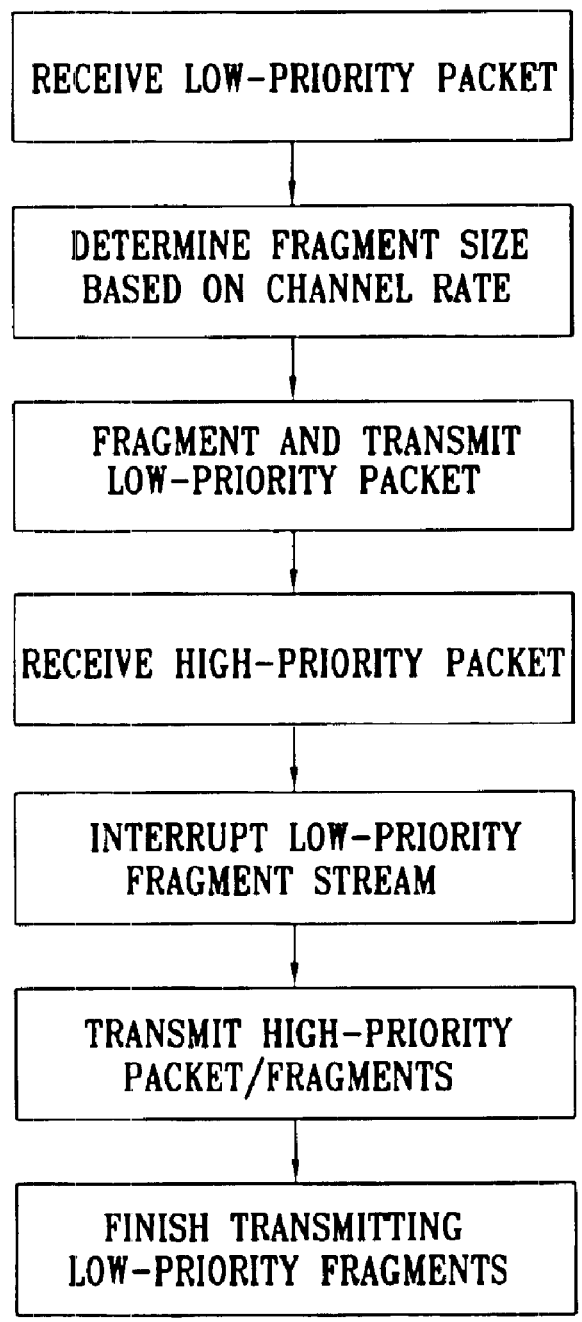
FIG. 2 is a flow chart that schematically illustrates a method for dynamic fragmentation of data packets, in accordance with a preferred embodiment of the present invention.

FIG. 2 is a flow chart that schematically illustrates a method for dynamic packet fragmentation carried out by fragmenter 28, in accordance with a preferred embodiment of the present invention. As noted above, this method is based both on user-defined parameters and on the rate of data transmission over channel 25. Preferably, the user-defined parameters include the following:

MaxL_In=maximum packet length (in bytes) that the transmitter can receive.

MinL_Fr=minimum fragment length (in bytes) allowed after fragmentation.

Max_Wait=maximum time (in ms) that a high-priority packet can be allowed to wait before starting transmission.

Each fragment contains a certain fixed number of overhead bytes, referred to herein as Overhead. The size of the Overhead is typically determined in accordance with the applicable standards, such as the above-mentioned FRF.12 agreement.

When fragmenter 28 receives a low-priority packet for transmission, it determines the parameters for fragmenting the packet based on the current data rate of system 20. A temporary fragment length (in bytes) for the packet is defined as:

Temp_Frag_Length=Int{ (Max_Wait×Rate)/8}−Overhead.

Here "Rate" is the actual, instantaneous rate of channel 25 in kbps, determined by front end 30. The temporary fragment length is proportional to the maximum wait set by the user and increases in integer steps as a function of the rate. The fragmenter sets the actual fragment length to the minimum of the dynamic Temp_Frag_Length and the static MinL_Fr set by the user, which provides a lower bound on fragment size in low-rate situations. Thus, the fragmenter calculates, for each value of the actual channel data rate, the optimal fragment length based on considerations of overhead and maximum permitted delay. It then divides the low-priority packet into fragments, and begins transmitting the fragments sequentially.

If a high-priority packet is received for transmission before all of the low-priority fragments have been sent, the low-priority fragment stream is interrupted, in order to allow the high-priority packet to be transmitted first (either fragmented or not). The delay of the high-priority packet will generally be no greater than the Max_Wait set by the user. The remaining fragments of the low-priority packet are sent only after transmission of the high-priority packet is completed.

Table I below presents the fragment payload size, maximum delay and fractional overhead encountered in system 20 at a range of different data rates that are commonly encountered in DSL and other low-bandwidth channels. The table compares the results achieved using dynamic fragmentation, in accordance with a preferred embodiment of the present invention, as against the results using static fragmentation, with fixed fragment size, as in systems known in the art. The overhead per fragment is assumed to be 10 bytes, and the maximum permissible delay (Max_Wait) for high-priority packets is 5 ms.

TABLE I

| | Static fragmentation | | | Dynamic fragmentation | | |
|---|---|---|---|---|---|---|
| Rate (kbps) | Frag. size (byte) | Max. delay (ms) | O/H fraction | Frag. size (byte) | Max. delay (ms) | O/H fraction |
| 2300 | 70 | 0.3 | 1/8 | 1427 | 5 | 1/144 |
| 512 | 70 | 1.25 | 1/8 | 310 | 5 | 1/32 |
| 128 | 70 | 5 | 1/8 | 70 | 5 | 1/8 |

As will be observed in the table, dynamic fragmentation provides worst-case behavior (at the minimum data rate) no worse than static fragmentation with the same system parameters. At high data rates, however, the present invention achieves substantially higher efficiency, in terms of reducing the relative overhead burden.

Although the preferred embodiment described hereinabove relates to fragmentation of data packets, the principles of the present invention are equally applicable to fragmentation of frames and datagrams of other types, as well. It thus will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for transmitting data over a channel having a variable transmission rate, comprising:

determining the rate of transmission of the data over the channel;

receiving a datagram for transmission over the channel at the determined rate of transmission;

dividing the datagram into fragments of a size no greater than a size limit that is set for the datagram responsive to the determined rate of transmission; and transmitting the fragments over the channel, wherein dividing the datagram comprises setting the size limit such that a length of time required to transmit each of the fragments is no greater than a predetermined maximum time, and wherein receiving the datagram comprises receiving a datagram associated with a low-priority service, and wherein the predetermined maximum time comprises a maximum delay applicable to other datagrams associated with a high-priority service, which are also transmitted over the channel.

2. A method according to claim 1, wherein the rate of transmission is in a range between about 100 kilobits per second (kbps) and about 2300 kbps.

3. A method according to claim 1, wherein the channel comprises a Digital Subscriber Line (DSL) network access channel.

4. A method according to claim 1, wherein the datagram comprises a data packet.

5. A method according to claim 1, wherein transmitting the fragments comprises interrupting transmission of the fragments of the datagram associated with the low-priority service in order to transmit at least one of the other datagrams associated with the high-priority service with a delay no greater than the maximum delay.

6. A method according to claim 1, wherein dividing the datagram into fragments comprises increasing the size limit as the rate of transmission increases.

7. A method according to claim 1, and comprising receiving the fragments over the channel at a receiver, and processing the fragments responsive to the variable rate of transmission so as to reassemble the datagram.

8. A method for transmitting data over a channel having a variable transmission rate, comprising:

determining the rate of transmission of the data over the channel;

receiving a datagram for transmission over the channel at the determined rate of transmission;

dividing the datagram into fragments of a size no greater than a size limit that is set for the datagram responsive to the determined rate of transmission; and transmitting the fragments over the channel, wherein dividing the datagram into fragments comprises increasing the size limit as the rate of transmission increases, and wherein dividing the datagram comprises dividing the datagram into fragments having a fixed overhead size and a variable payload size, such that a ratio of the payload size to the overhead size increases as the rate of transmission increases.

9. A method for transmitting data over a channel having a variable transmission rate, comprising:

determining the rate of transmission of the data over the channel;

receiving a datagram for transmission over the channel at the determined rate of transmission;

dividing the datagram into fragments of a size no greater than a size limit that is set for the datagram responsive to the determined rate of transmission; and transmitting the fragments over the channel, wherein dividing the datagram into fragments comprises increasing the size limit as the rate of transmission increases, and wherein dividing the datagram into fragments comprises setting the size limit responsive to fragmentation control parameters programmed by a human operator, and wherein increasing the size limit comprises increasing the limit automatically as the rate of transmission increases, substantially without alteration of the parameters.

10. Apparatus for transmitting data over a channel having a variable transmission rate, comprising a transmitter, adapted to set the rate of transmission of the data over the channel and to set a fragment size limit responsive to the determined rate of transmission and, upon receiving a datagram for transmission over the channel, to divide the datagram into fragments of a size no greater than the fragment size limit and to transmit the fragments over the channel, wherein the transmitter is adapted to set the size limit such that a length of time required to transmit each of the fragments is no greater than a predetermined maximum time, and wherein the datagram is associated with a low-priority service, and wherein the predetermined maximum time comprises a maximum delay applicable to other datagrams associated with a high-priority service, which are also transmitted over the channel.

11. Apparatus according to claim 10, wherein the rate of transmission is in a range between about 100 kilobits per second (kbps) and about 2300 kbps.

12. Apparatus according to claim 10, wherein the channel comprises a Digital Subscriber Line (DSL) network access channel.

13. Apparatus according to claim 10, wherein the datagram comprises a data packet.

14. Apparatus according to claim 10, wherein the transmitter is adapted to interrupt transmission of the fragments of the datagram associated with the low-priority service in order to transmit at least one of the other datagrams associated with the high-priority service with a delay no greater than the maximum delay.

15. Apparatus according to claim 10, wherein the transmitter is adapted to increase the size limit as the rate of transmission increases.

16. Apparatus according to claim 10, comprising a receiver, coupled to receive the fragments over the channel and to process the fragments responsive to the variable rate of transmission so as to reassemble the datagram.

17. Apparatus for transmitting data over a channel having a variable transmission rate, comprising a transmitter, adapted to set the rate of transmission of the data over the channel and to set a fragment size limit responsive to the determined rate of transmission and, upon receiving a datagram for transmission over the channel, to divide the datagram into fragments of a size no greater than the fragment size limit and to transmit the fragments over the channel, wherein the transmitter is adapted to increase the size limit as the rate of transmission increases, and wherein the fragments have a fixed overhead size and a variable payload size, such that a ratio of the payload size to the overhead size increases as the rate of transmission increases.

18. Apparatus for transmitting data over a channel having a variable transmission rate, comprising a transmitter, adapted to set the rate of transmission of the data over the channel and to set a fragment size limit responsive to the determined rate of transmission and, upon receiving a datagram for transmission over the channel, to divide the datagram into fragments of a size no greater than the fragment size limit and to transmit the fragments over the channel, wherein the transmitter is adapted to increase the size limit as the rate of transmission increases, and wherein the transmitter is adapted to set the size limit responsive to fragmentation control parameters programmed by a human operator, and to increase the size limit automatically as the rate of transmission increases, substantially without alteration of the parameters by the operator.

* * * * *